US006343272B1

(12) United States Patent
Payne et al.

(10) Patent No.: US 6,343,272 B1
(45) Date of Patent: *Jan. 29, 2002

(54) SYSTEM FOR ANALYZING AND MANAGING EQUITY PARTICIPATION LIFE INSURANCE AND ANNUITY CONTRACTS

(75) Inventors: Richard Christopher Payne, Misissauga (CA); Richard Wallace Mann; Melvin George Todd, both of Dallas, TX (US); Marc Guy Verrier, Erin (CA); John Anthony Stracka, Macfarland, WI (US)

(73) Assignee: FDI/Genesis, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/475,163

(22) Filed: Dec. 30, 1999

Related U.S. Application Data

(63) Continuation of application No. 08/769,798, filed on Dec. 19, 1996, now Pat. No. 6,049,772, which is a continuation of application No. 08/183,834, filed on Jan. 21, 1994, now abandoned.

(51) Int. Cl.[7] ............................................... G06F 17/60
(52) U.S. Cl. .......................................................... 705/4
(58) Field of Search .............................. 705/1, 3, 4, 35, 705/36, 38; 283/54; 707/10, 100–104

(56) References Cited

U.S. PATENT DOCUMENTS

| 4,642,768 A | 2/1987 | Roberts |
| 4,739,478 A | 4/1988 | Roberts et al. |
| 4,742,457 A | 5/1988 | Leon et al. |
| 4,750,121 A | 6/1988 | Halley et al. |
| 4,839,804 A | 6/1989 | Roberts et al. |
| 4,876,648 A | 10/1989 | Lloyd |
| 4,969,094 A | 11/1990 | Halley et al. |
| 5,126,936 A | 6/1992 | Champion et al. |
| 5,191,522 A | 3/1993 | Bosco et al. |
| 5,202,827 A | 4/1993 | Sober |
| 5,214,579 A | 5/1993 | Wolfberg et al. |
| 5,291,398 A | 3/1994 | Hagan |
| 6,049,772 A | 4/2000 | Payne et al. |
| 6,052,673 A | 4/2000 | Leon et al. |
| 6,105,865 A | 8/2000 | Hardesty |

FOREIGN PATENT DOCUMENTS

EP 0 573 991 A1 * 12/1993

OTHER PUBLICATIONS

Kase, Cynthia, "Hedging without futures", NPN: National Petroleum News, v85n11, PP:86, Oct. 1994, ISSN: 0149–5267, Dialog file 15, Accession No. 00774715.*

Fortune, vol. 111, pp. 115–119, Kessler, Felix, "Who's Winning in the Options Boom," Mar. 18, 1985.

Institutional Investor, vol. 25, No. 10, pp. 57–65, Hansell, Saul, "The Risk Collectors," Sep. 1991.

(List continued on next page.)

Primary Examiner—Frantzy Poinvil
(74) Attorney, Agent, or Firm—Dickstein Shapiro Morin & Oshinsky, LLP

(57) ABSTRACT

A system for analyzing and managing a plurality of specified life insurance policies and annuity contracts on behalf of an insurance carrier. The life insurance policies or annuity contracts depend on stock market performance in that the account value increase is determined as a percentage of the performance of a stock market index, with set caps and floors. The percentage is adjusted according to the yield on fixed rate assets. The system manages the increased risk from participation in the stock market by periodically monitoring assets and liabilities and determining the purchase and sale of stock options and other hedging instruments to cover the risks. The system also provides cash and profit determinations from the life insurance policies and annuity contracts.

28 Claims, 3 Drawing Sheets

OTHER PUBLICATIONS

Wall Street Computer Review, vol. 9, No. 4, pp. 40–46, 62, Goodman, Ann, "New Trading Products Spawn New Systems," Jan. 1992.

International Financial Law Review, Supp., pp. 36–55, Dropkin, Charles E. et al, "Swaps, The Evolving Market," Jan. 1992.

Treasury Releases Long Awaited Study on Taxation of Life Insurance Products, Treasury Reports, 90 TNT 70–12, Apr. 2, 1990.

Actuarial Standard of Practice 15, American Academy of Actuaries (ASOP15).

Actuarial Standard of Practice 1, American Academy of Actuaries (ASOP1).

* cited by examiner

SYSTEM FOR ANALYZING AND MANAGING EQUITY PARTICIPATION LIFE INSURANCE AND ANNUITY CONTRACTS

This application is a continuation of application Ser. No. 08/769,798 filed on Dec. 19, 1996, now U.S. Pat. No. 6,049,772 which is a con of Ser. No. 08/183,834 Jan. 21, 1994 now abandoned.

FIELD OF THE INVENTION

The present invention relates to a computer system for analyzing and managing life insurance and annuities on behalf of an insurance company. More specifically, it relates to a system in which the cash values, death benefits and surrender values of the life insurance or annuity are partially related to stock market performance.

BACKGROUND OF THE INVENTION

Individuals often purchase life insurance which has cash value accumulation in addition to death benefits. The cash value can be withdrawn, borrowed, or received upon termination of the policy. Corporations may purchase or sponsor life insurance as a financing vehicle for benefit plan costs or other liabilities. Such policies can have beneficial tax consequences for the corporation. Similarly, deferred annuity contracts have account value buildup which can be withdrawn, received on surrender, or taken as annuity payments. Naturally, higher return rates for life insurance policies or deferred annuity contracts will increase the accumulated cash value to the benefit of the owner.

Generally, insurance companies use two approaches for investing the premiums to provide the cash value increases for life insurance policies and annuity contracts, general account and separate account ("variable"). Using the general account approach, a life insurance company will usually invest conservatively with an emphasis on fixed income assets such as high grade corporate bonds. Such policies offer a guarantee of principal and some minimum return, often 4%. Where a policy owner desires a higher return on cash values than afforded by these conservative investments, it may purchase a variable life policy or annuity contract. A variable life policy or annuity contract offers various investment alternatives including equities which have traditionally realized a higher return than fixed income instruments. Of course, higher rewards typically require more risk taking. Likewise, variable life insurance policies or annuity contracts have no minimum cash value guarantees. The typical life insurance company is unwilling to offer the policy owner the upside rewards of variable life while it assumes the downside risks by making guarantees of the general account type policy.

Therefore, a substantial need exists for a system which manages insurance company investments related to life insurance policies and deferred annuity contracts to potentially generate significant upside returns to the policy owner with little or no downside risk to the policy owner or insurance company.

SUMMARY OF THE INVENTION

In view of the foregoing, there exists a need in the art for a system which enables insurance companies to effectively and efficiently provide equity returns, without substantial loss risks. A need also exists for a life insurance policy, annuity contract, or other financial product which allows for improved return on investment to the owner, also without significant downside risks.

The present invention provides a life insurance policy or annuity contract which includes partial participation in stock market returns with specified caps and floors. The present invention provides a system for analyzing assets and liabilities of the insurance carrier relating to such policies and for determining the purchase and sale of options, swaps, calls or other hedging instruments to match assets and liabilities. Therefore, it is an object of the invention to provide assurances to the insurance company that the stock or equity market participation element of the life insurance or annuity can be met through conservative investments without undue risks to the carrier or policy owner.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF A PREFERRED EMBODIMENT

Figure 1:
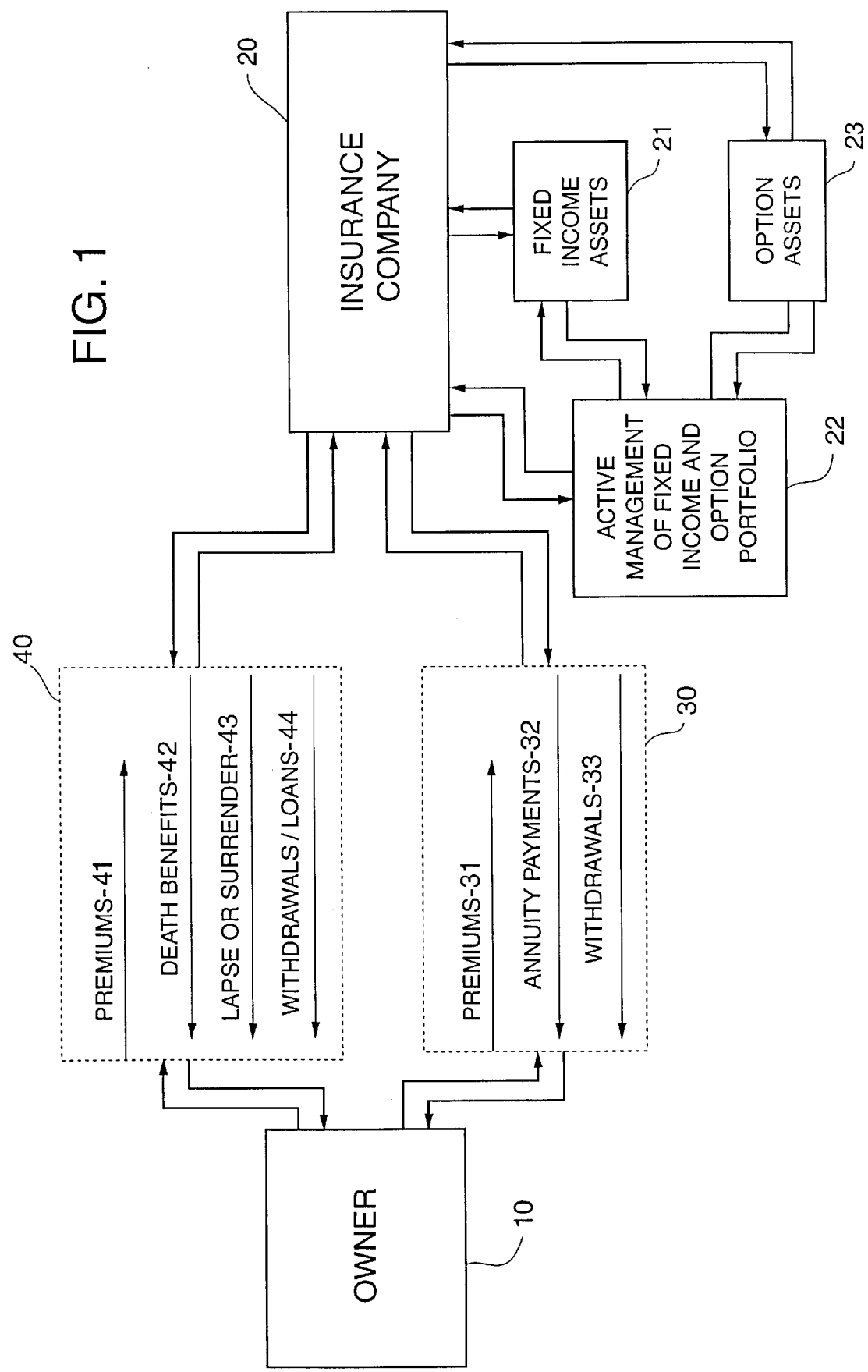
FIG. 1 is a block flow diagram showing investment organization according to a preferred embodiment of the present invention.

Referring now in detail to the drawings wherein like parts are designated by like reference numerals throughout, there is illustrated in FIG. 1 a life insurance policy 40 and annuity contract 30 according to the preferred embodiment of the present invention. A policy owner 10 pays premiums 31, 41 to an insurance company 20. For an annuity contract 30, upon completion of the term, the owner receives annuity payments 32. For a life insurance policy 40, upon the death of the insured, the insurance company 20 pays a death benefit 42 under the life insurance policy 40 to the beneficiary named by the owner 10. The owner 10 can also remove money from the annuity contract 30 or life insurance policy 40 through withdrawals 33, 44, loans 44, or surrender 43 wherein the policy 40 is terminated and the account value, less any surrender charges, is returned to the owner 10. Death benefits 42 are described below, but annuity payments 32, withdrawals 33, 44, loans and surrender payments 43 may also be made depending upon the reason for termination of the policy—death of the insured, end of term, loan, withdrawal, or surrender by the owner 10.

The death benefits 42 and cash values depend on stock index performance as discussed further below. Typically, an insurance company invests in fixed income assets 21 in order to provide the necessary return on investment to meet liabilities, including death benefits, withdrawals or surrender payments. Since under the present invention the death benefit 42 and cash value depend on stock index performance, fixed income assets may be insufficient to meet liabilities. Therefore, the insurance company can either (1) actively manage a fixed income and option portfolio 22, or (2) manage a fixed income portfolio 21 and purchase an option which closely or exactly matches the liability risk 23. In addition, an insurance company could self-insure for the investment risk, or actively manage a stock portfolio.

However, these last two possibilities are not viable alternatives for typical insurance carriers, and are not contemplated under the present invention.

Figure 2:
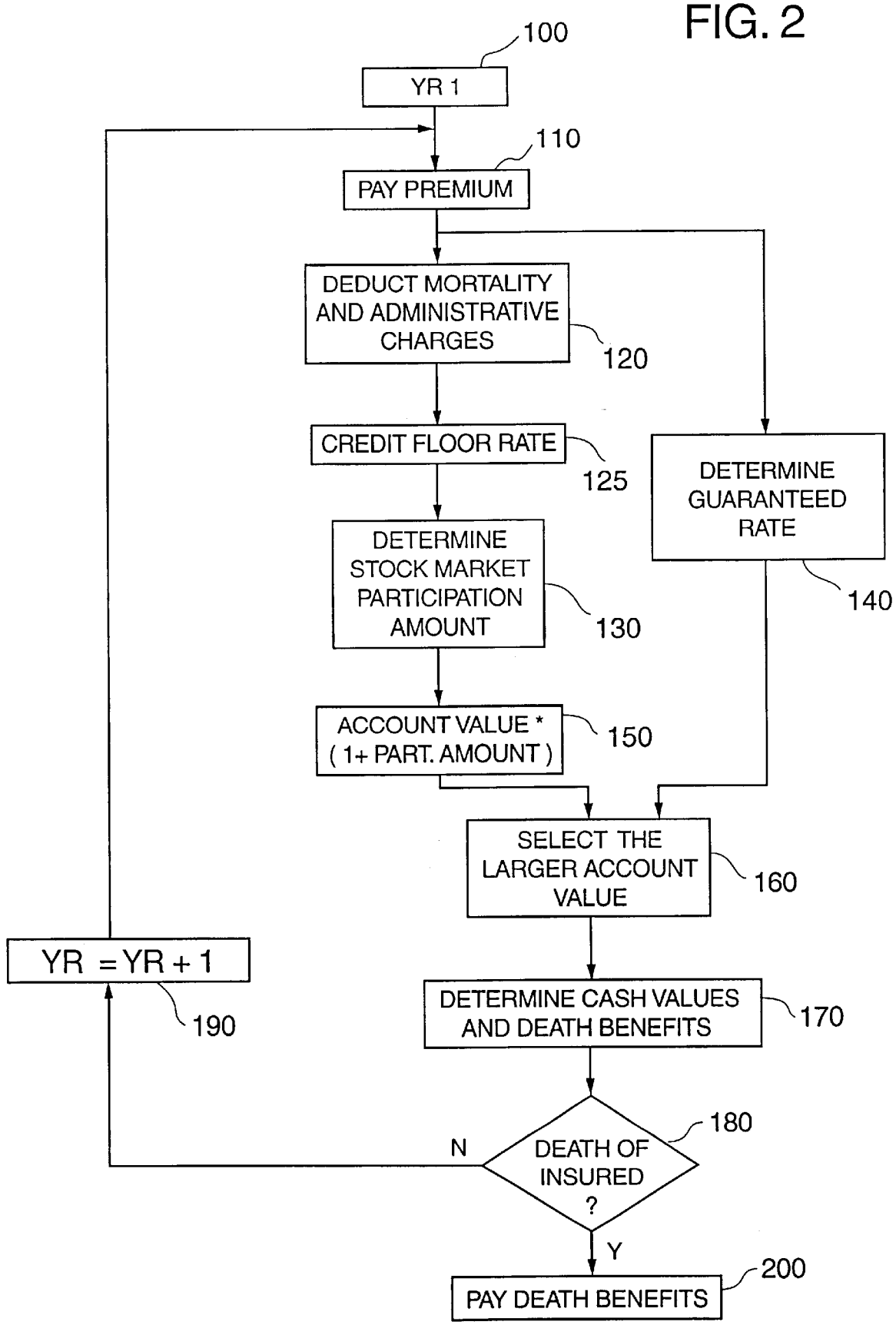
FIG. 2 is a block flow diagram of the insurance product according to a preferred embodiment of the present invention.

FIG. 2 is a block flow diagram illustrating operation of an insurance product which is the subject of the present invention. Premiums are paid at step 110. By way of example, a $40,000 single premium policy with an assumed average issue age of 45 would apply to a death benefit face amount of approximately $125,000. From the premium, mortality and administrative charges are deducted periodically at step 120.

The performance of the policy is determined by a participation rate based upon increases in a stock market index such as Standard & Poor's 500 Index ("S&P Index"). To provide additional flexibility of performance, return can be based upon participation in other stock or financial indices, such as the Japanese Nikkei index, the German DAX index, the Canadian TSE 300 index, currency indices, treasury rate indices, and fixed rate indices. The floor rate is credited to the account value throughout the year at step 125. The return is adjusted on a yearly basis at step 130 with respect to the beginning of year account value. Of course, the premiums could be paid and cash values could be adjusted on other than a yearly basis. The participation rate is multiplied by the increase in the S&P Index to determine an annual participation amount at step 130, subject to the set cap and floor. Of course, the cap may be set to an arbitrarily large value, thus negating its effect. The account value of the policy is determined yearly, at step 150, by increasing the previous year's account value by the participation amount. In addition, there may be guaranted cumulative returns, determined at step 140, to meet state regulatory requirements. The account value is recalculated yearly at step 160 based upon the greater of the stock market participation, including caps and floors, or the cumulative guaranteed rate.

Cash values and death benefits are then calculated with respect to the current account value. Death benefits are calculated in a known manner which complies with 26 U.S.C. §7702 to qualify as life insurance. The cash value and death benefit determination 170 is used to calculate the liabilities for the insurance company, as discussed below. If the insured dies (or the policy is terminated) during any annual period, determined at step 180, the insurance company pays the death benefit 200 (or surrender amount). Also, any withdrawals reduce the cash value.

For an annuity contract, premiums are paid and the cash values are calculated in a manner similar to the life insurance policy.

Figure 3:
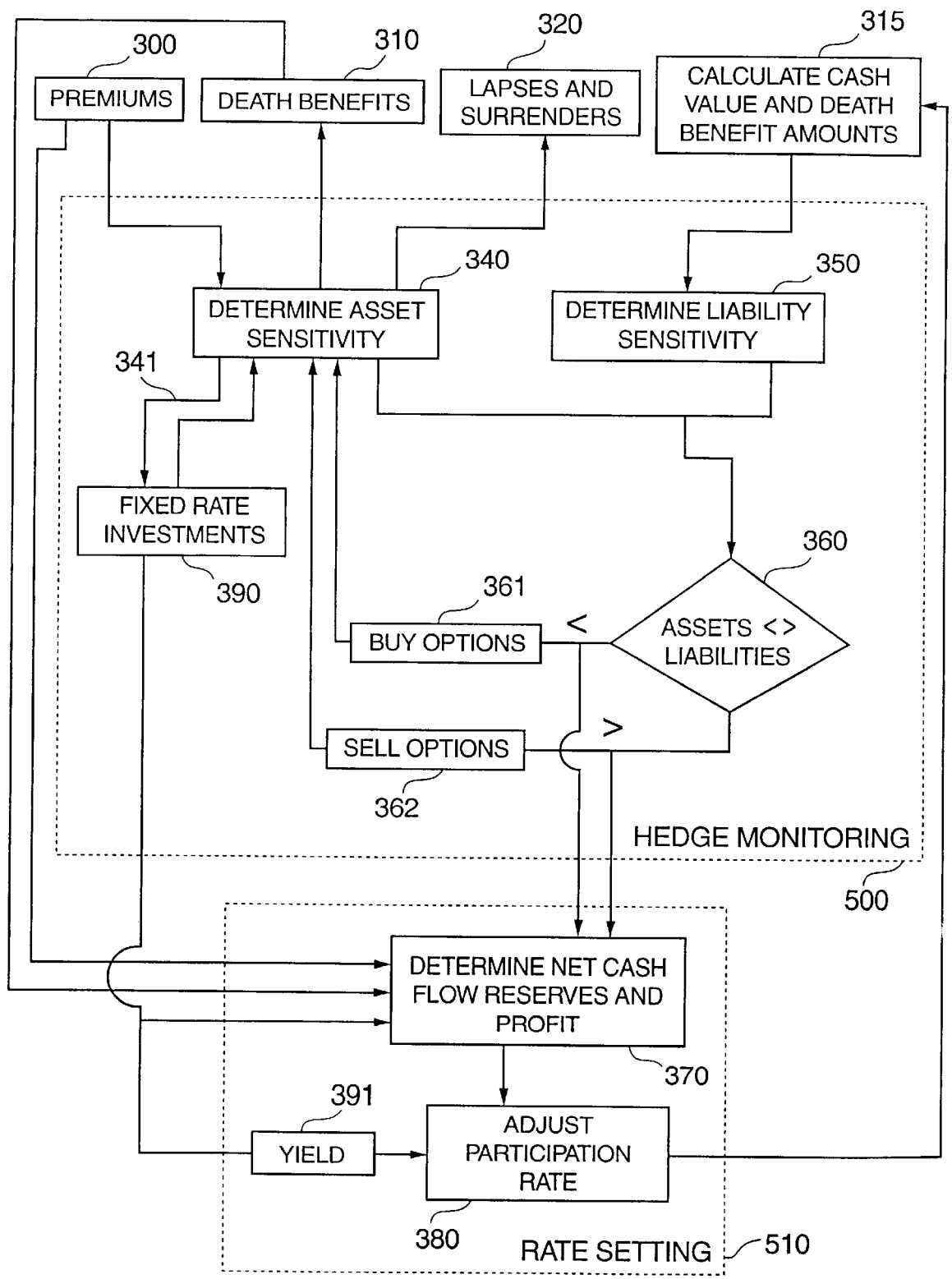
FIG. 3 is a block flow diagram of the analytical system for analyzing assets and liabilities according to a preferred embodiment of the present invention.

FIG. 3 is a block flow diagram and discloses a system for the insurance company to manage assets and liabilities in order to meet the cash values and death benefits owed on policies of the type illustrated with respect to FIG. 2. Preferably, the system is implemented on a digital computer including a CPU and various memories. Typically, insurance companies have a mainframe computer or mini-computer for performing other functions which can be used in the present system.

Premiums 300 are paid into total assets 340 and death benefits 310 are paid from total assets 340. The computer stores in memory information about the assets, such as the amount and characteristics of cash, options, bonds, and other investments.

A portion of the assets 341 is invested in fixed rate investments 390. The remainder of the assets are invested in options to hedge the risk from the stock index related performance of the liability. Alternative methods for hedging risks such as swaps, calls and reinsurance can be used in place of or in conjunction with options.

The Black-Scholes formula, or other option pricing formula, is used to determine expected option costs in determining necessary hedging and pricing. The Black-Scholes formula provides an option cost based upon index price, exercise price, option term and assumptions of risk free rates of return, average dividend yield, and volatility of returns (standard deviation of returns). Since the life insurance policy has floor and cap rates of return, the option price is based upon the difference between the option price for the floor rate of return and for the cap rate of return.

For example, with a fifty percent participation rate, return of premium floor (0%), 10% cap return, a one year risk-free rate of 4%, an S&P 500 dividend yield of 3%, and a standard deviation of S&P returns of 15%, the option cost would be 2.65% of premium. Other premium related expenses for the product, i.e. mortality and administrative charges, are approximately 1.7% of premium. Thus, 95.65% of the premium remains to be invested in fixed assets. A return on fixed assets of 4.55% is sufficient to meet the return of premium floor.

Periodically, the system determines and compares the assets and liabilities to monitor hedges 500 and to determine appropriate investments, both for options and for fixed assets. Both assets and liabilities are interest and stock price sensitive. Insurance companies typically use a process for matching assets and liabilities with respect to interest rate changes. These processes can be used with respect to the fixed asset investments. The Black-Scholes formula, as discussed above, is used to value option risks in pricing and monitoring assets and liabilities.

The death benefits and cash values, as defined at step 170 of FIG. 2, are calculated for all policies according to the formula previously given and summed to determine the total liability 350 for all policies then in force. The assets 340 and liabilities 350 are compared at step 360 to determine whether they are appropriately matched relative to stock price changes. If the asset sensitivity to stock price changes is less than the liability sensitivity to stock price changes, then options are purchased at step 361 to hedge the liability risk. If asset sensitivity is greater than liability sensitivity then options can be sold at step 362 to again match the risk.

The purchase and sale of options is used to hedge against changes in stock prices. However, the possible impact of interest rate changes must also be considered. The insurance company's existing asset and liability matching system can be used to appropriately invest in fixed assets to hedge interest rate changes. Theoretically, both assets and liabilities are valued through stochastic simulation. Multiple interest rate scenarios are generated to project behavior of assets and liabilities and present value the results. This is a very computation-intensive approach. If non-exotic assets are used, i.e., ordinary fixed assets such as high-grade corporate bonds, then a simpler deterministic approach is sufficient. One deterministic approach could be to use duration and convexity matching, which are well known. Alternatively, key or partial duration matching could be used, which calculates price changes resulting from shocks to interest rates at key term points on the yield curve, such as 1 year, 10 year and 30 year rates. Fixed assets are purchased or sold to match interest rate sensitivities for assets and liabilities.

The asset portfolio is managed to keep the sensitivities close to targets determined by the investment strategy. By periodically monitoring and matching the risk, the insurance company can maintain profits and meet death benefit (or surrender value) liabilities. As part of these hedging activities, the system also shows changes in market values of assets, liabilities and economic surplus per point change in the S&P 500 Index or other index and per basis point change of interest at key or partial durations, to assess the effectiveness of hedging operations.

The system also determines the net cash flow and profit at step 370. Net cash flow and profits depend upon premiums 300 received, death benefits 310 paid, purchases 361 and sales 362 of options, and any gains on fixed rate investments 390.

Periodically, the participation rate is adjusted in order to keep earnings as stable as possible. The accumulated profit on the block of assets is compared with the target accumulated profit. If the actual profit exceeds the target, then the participation rate is increased for policies with anniversaries falling within the period. If actual profitability is less than target, then the participation rate for new issues and rollovers will be decreased.

The initial pricing and subsequent annually determined participation rate and any corresponding caps are adjusted and depend directly upon the yield of fixed income investments 390 in the insurance company's portfolio. If a cap is not desired, its initial value may be set to be arbitrarily large, thus negating its effect. Average book yield can be used for restricted liquidity products, but new money yield should be used for greater liquidity products to prevent investment antiselection. Therefore, as the fixed income yield 391 increases so does the participation rate of the policyholder. The participation rate and cap rate are determined according to the following formula:

$$1 = E + OC(\text{participation rate, participation cap}) + 1/(1+Y)$$

where:

E is a percentage of premium expense factors;

OC is the cost of the equity participation option based on the rate and cap; and Y is the yield on fixed income instruments with a maturity equal to that option.

E is initially set to the product expenses (expressed as a level percentage of premium), and the rate and cap are determined for different interest rate levels as described above. E is then adjusted and the equation re-solved at different interest rates to achieve the desired profit results. Table 1 below illustrates example participation rates and cap rates for given yields.

TABLE 1

| Yield | Participation Rate | Cap Rate |
|---|---|---|
| 5% | 22% | 8% |
| 6% | 35% | 10% |
| 7% | 46% | 12% |
| 8% | 55% | 14% |
| 9% | 63% | 16% |
| 10% | 69% | 18% |
| 11% | 73% | 20% |
| 12% | 77% | 22% |

The participation rate is used in determining the estimated death benefits as part of the liabilities. Changes in the participation rate are selected so that earnings are kept fairly stable without large fluctuations in the participation rate. Expected investment income and expected policy credit over an accounting period, as determined by the system, provides feedback on the effectiveness of the rate setting process and a guide to future rate setting.

Through periodic determination of assets and liability and the purchase and sale of appropriate options to match the liability risks, the insurance company is protected from the risks resulting from a volatile stock market. The policy owner 10 also is provided with increased equity participation in a life insurance policy with limited downside risks.

Although a preferred embodiment is specifically illustrated and described herein, it will be appreciated that modifications and variations of the present invention are covered by the above teachings and within the perview of the appended claims without departing from the spirit and intended scope of this invention.

What is new and deemed to be protected by Letters Patent in the United States is:

1. A computer system comprising:

collection means for collecting and inputting an initial premium value for at least one account at a first time period;

said at least one account comprises an account value, wherein at said first time period said account value is based on said initial premium value, and during successive time periods said account value varies at a value rate when said value rate is greater than a floor rate and said account value varies at said floor rate when said value rate is less than said floor rate;

wherein said value rate comprises the product of a participation rate and a change in a value of a predetermined stock index, wherein the participation rate is a predetermined percentage;

input means for receiving said values of said predetermined stock index;

account valuation and hedge factor means for determining an account value of said account and for determining a benefit hedge factors from at least said participation rate and said floor rate;

transfer command means for outputting a transfer command to transfer assets to at least one fixed rate instrument and at least one hedging instrument relative to said benefit hedge factors; and participation rate determining means for determining said participation rate in at least one of said successive periods according to:

$$1 = E + OC + 1/(1+Y)$$

wherein E is a percentage of premium expense factor, OC is a cost of an equity participation option based on said participation rate, and Y is a yield on fixed rate instruments with a maturity equal to said hedging instrument.

2. A computer system as claimed in claim 1 further comprising:

a second account with a second participation rate and a second floor rate, wherein said account valuation and hedge factor means determine a hedge factor from at least said participation rate, said second participation rate, said floor rate and said second floor rate.

3. A computer system as claimed in claim 2, wherein said account value of said at least one account, during successive periods, varies at a value rate when said value rate is greater than a floor rate and less than a cap rate, said account value varies at said floor rate when said value rate is less than said floor rate and said account value varies at a cap rate when said value rate exceeds said cap rate, and said account value of said second account, during successive periods, varies at a second value rate when said second value rate is greater than said second floor rate and less than a second cap rate, said account value of said second account varies at said floor rate when said second value rate is less than said floor rate and said second account value varies at a second cap rate when said second value rate exceeds said cap rate.

4. A computer system as claimed in claim 1, wherein said account valuation and hedge factor means determines said hedge factor from at least said participation rate, said floor rate and an interest rate change factor.

5. A computer system as claimed in claim 1, further comprising:
net cash flow determining means for comparing projected profits and target profits;
participation rate adjustment means for increasing said participation rate if said projected profits exceed said target accumulated profits and for decreasing said participation rate when said target profits exceed said projected profits.

6. A computer system as claimed in claim 1, wherein said account value during successive periods varies at a value rate when said value rate is greater than a floor rate and less than a cap rate, said account value varies at said floor rate when said value rate is less than said floor rate and said account value varies at a cap rate when said value rate exceeds said cap rate.

7. A computer system as claimed in claim 1, wherein said successive time periods are predetermined time intervals.

8. A computer system as claimed in claim 7, wherein said predetermined time intervals are one year.

9. A computer system as claimed in claim 1, wherein said predetermined stock index comprises a stock index.

10. A computer system as claimed in claim 1, wherein said hedging instrument comprises an option.

11. A computer system as claimed in claim 1, wherein said hedging instrument comprises a swap.

12. A computer system as claimed in claim 1, wherein said hedging instrument comprises a call option.

13. A computer system as claimed in claim 1, wherein said hedging instrument comprises a reinsurance contract.

14. A computer system as claimed in claim 1, wherein at least one hedging instrument comprises a stock index future.

15. An insurance policy computer system comprising:
collection means for collecting and inputting an initial premium value for an insurance policy account at a first time period;
said insurance policy account comprises an account value, wherein at said first time period said account value is based on said initial premium value, and during successive time periods said account value varies at a value rate when said value rate is greater than a floor rate and said account value varies at said floor rate when said value rate is less than said floor rate;
wherein said value rate comprises the product of a participation rate and a change in a value of a predetermined stock index, wherein the participation rate is a predetermined percentage;
input means for receiving said values of said predetermined stock index;
account valuation and hedge factor means for determining an account value of said insurance policy account and for determining a benefit hedge factors from at least said participation rate and said floor rate;
transfer command means for outputting a transfer command to transfer assets to at least one fixed rate instrument and at least one hedging instrument relative to said benefit hedge factors; and
participation rate determining means for determining said participation rate in at least one of said successive periods according to:

$$1 = E + OC + 1/(1+Y)$$

wherein E is a percentage of premium expense factor, OC is a cost of an equity participation option based on said participation rate, and Y is a yield on fixed rate instruments with a maturity equal to said hedging instrument.

16. An insurance policy computer system as claimed in claim 15 further comprising:
a second insurance policy account with a second participation rate and a second floor rate, wherein said account valuation and hedge factor means determine a hedge factor from at least said participation rate, said second participation rate, said floor rate and said second floor rate.

17. An insurance policy computer system as claimed in claim 16, wherein said account value of said insurance policy account, during successive periods, varies at a value rate when said value rate is greater than a floor rate and less than a cap rate, said account value varies at said floor rate when said value rate is less than said floor rate and said account value varies at a cap rate when said value rate exceeds said cap rate, and
said account value of said second insurance policy account, during successive periods, varies at a second value rate when said second value rate is greater than said second floor rate and less than a second cap rate, said account value of said second insurance policy account varies at said floor rate when said second value rate is less than said floor rate and said second account value varies at a second cap rate when said second value rate exceeds said cap rate.

18. An insurance policy computer system as claimed in claim 15, wherein said account valuation and hedge factor means determines said hedge factors from at least said participation rate, said floor rate and an interest rate change factor.

19. An insurance policy computer system as claimed in claim 15, further comprising:
net cash flow determining means for comparing projected profits and target profits;
participation rate adjustment means for increasing said participation rate if said projected profits exceed said target profits and for decreasing said participation rate when said target profits exceed said projected profits.

20. An insurance policy computer system as claimed in claim 15, wherein said account value during successive periods varies at a value rate when said value rate is greater than a floor rate and less than a cap rate, said account value varies at said floor rate when said value rate is less than said floor rate and said account value varies at a cap rate when said value rate exceeds said cap rate.

21. An insurance policy computer system as claimed in claim 15, wherein said successive time periods are predetermined time intervals.

22. An insurance policy computer system as claimed in claim 20, wherein said predetermined time intervals are one year.

23. An insurance policy computer system as claimed in claim 15, wherein said predetermined stock index comprises a stock index.

24. An insurance policy computer system as claimed in claim 15, wherein said hedging instrument comprises an option.

25. An insurance policy computer system as claimed in claim 15, wherein said hedging instrument comprises a swap.

26. An insurance policy computer system as claimed in claim 15, wherein said hedging instrument comprises a call option.

27. An insurance policy computer system as claimed in claim 15, wherein said hedging instrument comprises a reinsurance contract.

28. An insurance policy computer system as claimed in claim 15, wherein said at least one hedging instrument comprises a stock index future.

* * * * *